May 20, 1958 M. E. BARZELAY 2,835,597
SPRAY DRYING PROCESS
Filed Dec. 10, 1954 2 Sheets-Sheet 2
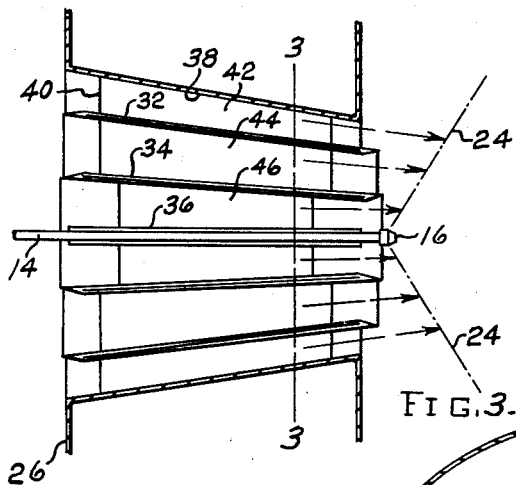
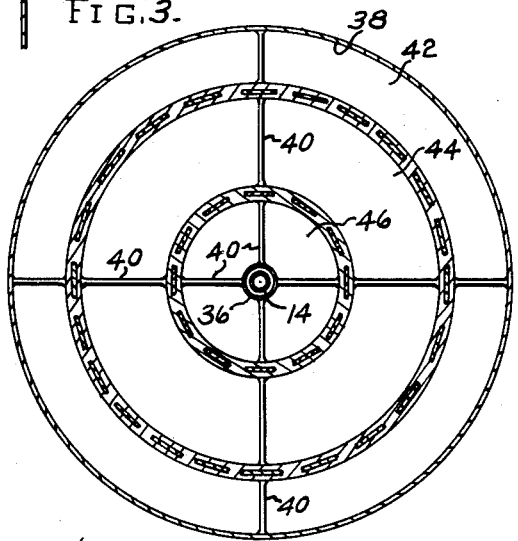
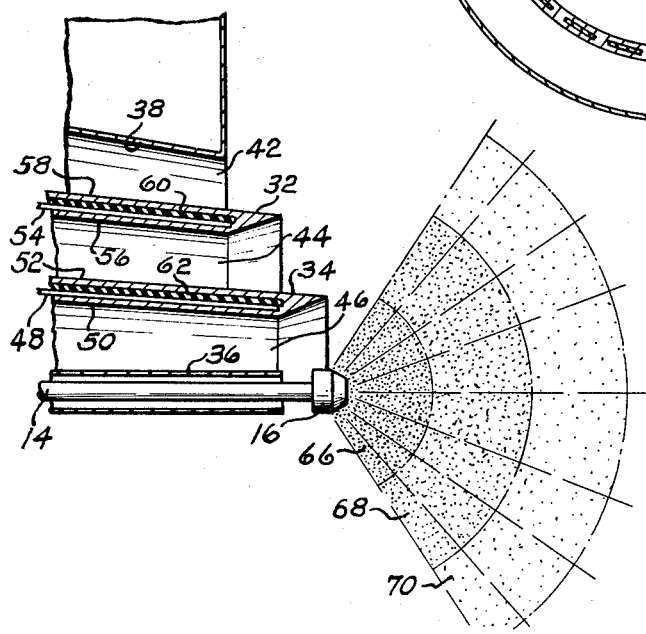
INVENTOR.
MARTIN E. BARZELAY
BY
ATTORNEY

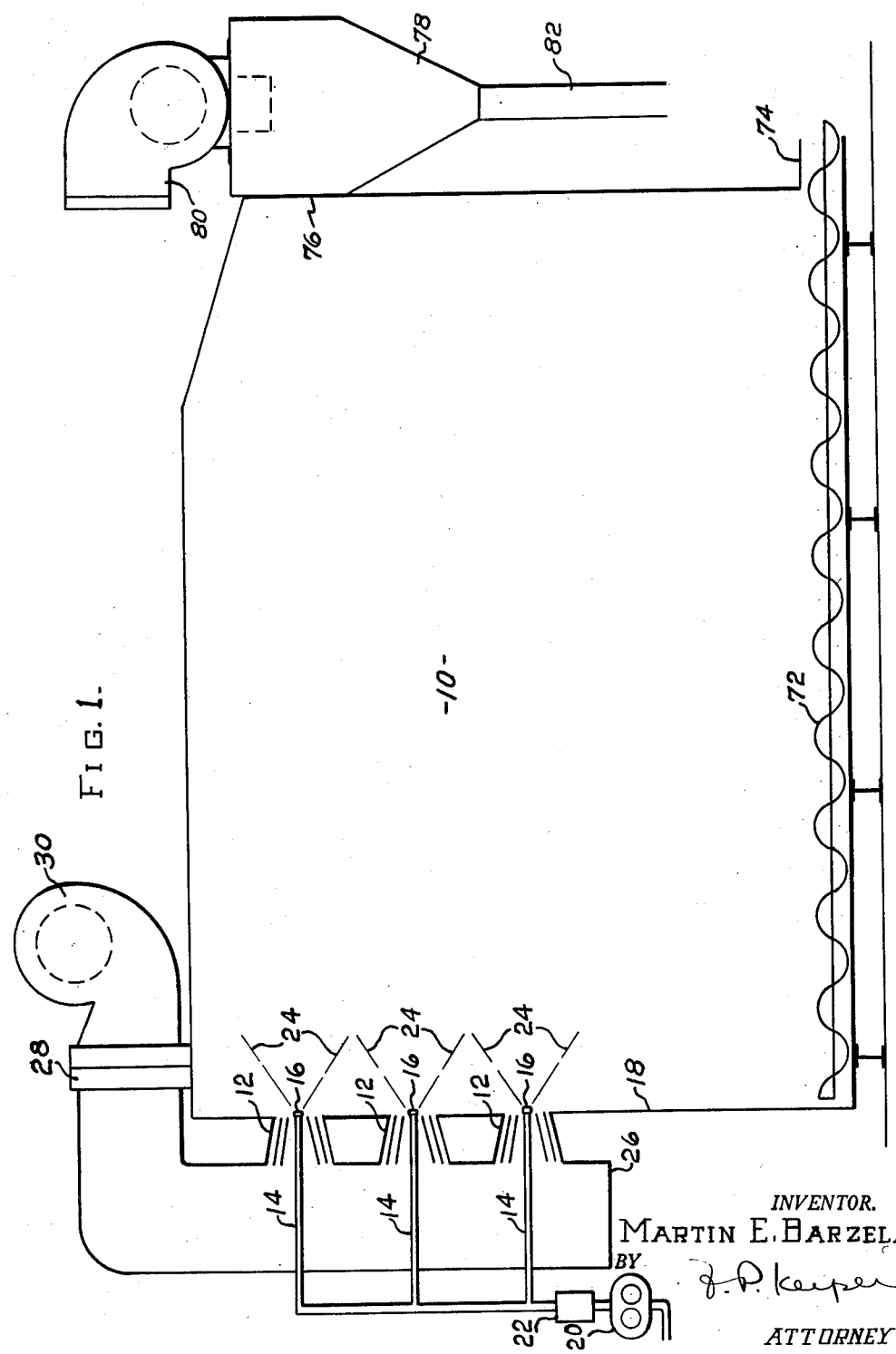

United States Patent Office 2,835,597
Patented May 20, 1958

2,835,597

SPRAY DRYING PROCESS

Martin E. Barzelay, Syracuse, N. Y.

Application December 10, 1954, Serial No. 474,457

14 Claims. (Cl. 99—203)

This invention relates to a process for spray drying liquids containing solids, such as milk in a condensed state, and more particularly relates to a continuous process wherein a fluid containing solids is atomized and subjected to a flow of controlled heated vaporizing medium.

In subjecting fluids such as milk to a heated drying medium, the temperature of the drying medium has generally been chosen at a point below a safe limit, in order that during the process the dry solids obtained will not be carbonized, scorched or otherwise injured by overheating. Thus any benefit in the quality or characteristics of the product which might be obtained by the use of a drying medium of higher temperature appears to have escaped consideration. Further, while it has been recognized that the highest temperature that can be used results in the greatest economic advantage, the apprehension of injury to the product has been a deterrent to employing the highest possible temperature.

The present process has to do with employing a drying medium of higher temperature in the evaporation process, and so controlling and graduating the temperature and velocity distribution of the medium in the region of the fluid spray as to provide maximum effectiveness, secure an improved resulting product while preventing overheating and injury to the product. The present process as applied to milk has been found to produce a product of improved quality and desirable characteristics in regard to the ability of the product to return to solution upon restoring the water evaporated during the process. Such improved product is in the form of a powder having coarse characteristics, and which result from controlling the drying action in a manner tending to promote increased droplet size in the drying chamber.

It is an object of the process to stratify or graduate the temperature of the evaporating medium in the region of evaporation in such a manner that the temperature of the evaporating medium will be greatest in the region of evaporation where the solids containing liquid is most concentrated and contains the most moisture, a lower temperature being employed in the region of evaporation where the solids containing liquid has reached a partially evaporated stage, and the degree of concentration substantially reduced. The process is such as to subject the solids containing liquid, while in an atomized state, to a gaseous drying medium, the temperature of which is varied in proportion to the degree of moisture present in the liquid at any particular region in the evaporating chamber. By controlling the temperature of the evaporating medium so that higher temperature medium is directed to regions in the spray where higher moisture content is present, the higher rate of evaporation prevents scorching or injury to, or undue coagulation of the product which might otherwise result from the usage of high temperature, if allowed to act upon the spray in regions where the moisture content had been lessened by partial evaporation.

It will also be appreciated that the velocity as well as the temperature may be stratified, employing differing velocities at different lateral distances from the liquid discharge point.

The evaporating medium, being of higher temperature, is of relatively low density, which results in an increased droplet size. The higher temperature provides for maximum rapidity of drying, with minimum exposure to drying heat. With higher temperature air, higher air velocities are possible, which contribute to rapid drying and quick removal of the dried milk from the heated region. Further, turbulence in the region of the air nozzles, likely to result in blow back and milk deposit on the nozzles with consequent fire hazard is substantially eliminated. Such action results in an increased proportion of coarse product which drop to the bottom of the collection chamber, leaving smaller amounts of small particles subject to entrainment in the air stream. The more coarse product is found to have improved quality in respect to more ready solubility and wettability and other desirable properties, such as improvement in taste and freedom from discoloration in the case of milk. Further, such coarse product in the case of whole milk, is improved in respect to stability, the process having the effect of decreasing the retained oxygen in the product.

The above and other novel features of the process will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a diagrammatic side elevation with parts broken away of a drying apparatus adapted to utilize the process;

Figure 2 is a sectional view through a hot air nozzle and sprayer adapted to effect the process;

Figure 3 is a transverse sectional view through a nozzle taken on the line 3—3 of Figure 2; and Figure 4 is an enlarged fragmentary sectional view of a portion of a nozzle at the mouth or exhaust end thereof.

Referring to the drawings wherein there is shown apparatus for effectually carrying out the process, there is shown an evaporating chamber 10, having at one end a plurality of air nozzles 12, each having a liquid supply conduit 14 concentrically disposed therewithin, each conduit having a spray jet 16 at its end, located just within the wall 18 of the chamber 10. The liquid supply conduits are connected to a high pressure pump 20 for supplying pressure at the nozzles in the order of 4,000 lb. per square inch. High supply pressure, or homogenizing pressure, particularly in the case of whole milk increases the viscosity. The liquid may be heated to a suitable temperature such as 130–170° F., the lower temperature being preferable in that the droplet size will tend to be increased by reason of increased surface tension and viscosity of the liquid. A heat exchanger 22 is provided for this purpose.

The milk supplied through the conduits 14 will preferably have its viscosity increased by previous removal of sufficient water to provide a solution, the solids content of which is about 40%. The jets 16 may provide a widely divergent conical spray pattern as indicated at 24 or if desired, centrifugal spray nozzles may be employed capable of producing a radial discharge across the mouth of the air nozzles 12, the air discharge of which will produce a parabolic spray pattern. The latter may be preferable because of the tendency to produce more uniformity in drop size, than other types of atomization.

The air nozzles are connected by a manifold 26 preferably of substantial cross section, to an air heater 28, and a centrifugal blower 30, the latter being of a capacity to deliver drying medium in sufficient quantity at a desired temperature to provide the degree of evaporation required within the chamber 10. The manifold 26 will be of sufficient size so as to afford opportunity for the heated air or medium to equalize itself, in regard to temperature, so that all air nozzles will at their entrance ends receive substantially the same quantity of air at substantially the same temperature.

While air, and drying medium have been referred to, the latter expression has been used, since the heater 28 may be of the direct fuel burning type, burning gas for example, with the products of combustion being added to the air stream. In such case, the air while being heated, will also include the products of combustion. Nevertheless the terms air and drying medium may be used interchangeably in reference to the herein process.

It will be appreciated that in the spray pattern shown, liquid will be reduced to a fog-like mist, and that such mist will be most dense close to the jet, and that the density within the pattern will decrease as the distance from the jet increases. To carry on the process of the invention, it is desired to direct evaporating air at a higher temperature into the region close to the nozzle, such air, by reason of its higher temperature, having a lower density. The higher temperature air thus directed into the heart of the spray pattern, will contact that portion of the spray which has the greatest density and moisture content. The consequent high rate of evaporation will be effective to offset any tendency of the higher temperature air to injure the resulting product. As the sprayed liquid moves away from the nozzle, partial evaporation of the moisture has taken place, and the temperature of the drying medium to which it may be subjected is reduced, in order to assure that the resultant product will not suffer injury.

As a means for bringing drying medium into contact with the spray at various regions thereof of a temperature which diminishes with the distance of the region from the spray nozzles, there is shown in Figures 2 and 3 an air nozzle having annular concentric passages, in which electrical heating units are employed to suitably boost the temperature of the air, in the region closest to the jet.

The air nozzle is provided with concentric sleeves 32 and 34 so as to divide the nozzle passage into, for example, three concentric passageways 42, 44 and 46. Such sleeves are shown as being uniformly spaced radially between the sleeve 36, through which the jet conduit 14 extends, and the outer conical wall 38 of the nozzle. The sleeves 32, 34 and 36 are supported by light struts such as 40, from the wall 38, the struts being of a streamlined contour to present a minimum of resistance to axial flow through the annular passageways 42, 44 and 46, formed by the sleeves.

To boost the temperature of the air passing through the passageway 46, the sleeve 34 is constructed hollow, and provided with an electrical resistance heating unit 48 adapted to elevate the internal and external surfaces 50 and 52 of the sleeve, so that the air passing through the passageway 46, and 44 will be heated to a temperature substantially above that entering the nozzle from the manifold 26. The sleeve 32 will also be provided with a similar electrical resistance heating unit 54 to heat the internal surface 56 of the sleeve 32. The external surface 58 of such sleeve will be protected from being heated by a layer of heat insulation 60 such as asbestos or the like, since boosting of the temperature of the air in the annular passage 42 is not desired for reasons of economy.

The sleeve 34 may also be provided with a layer of heat insulation 62 located between the heating unit and the surface 52, to increase the heating effect of the sleeve 34 upon the central annular passage 46, since the air passing through such passage is to be elevated to the maximum safe temperature to be employed. It will be appreciated that the cross section of the passage 46 will be substantially less than that of passage 44, where the radial spacing is uniform between sleeves, so that the quantity of air to be heated will be greatly less, whereas the area of the internal and external heating surface 50 and 52 of the sleeve 34 will be substantially alike. In practice, it may be desirable to eliminate the heating element 54 in the sleeve 32, and eliminate the heat insulation in the sleeve 34, since the resulting effect will be to apply about the same amount of heat to the smaller quantity of air passing through the passage 46, as to the larger quantity passing through the passage 44, with the result that the temperature of the air in passage 46 will be raised by an increment approximately twice that of the air in passage 44.

Assuming that air is heated to 300° F. by the heater 28, and enters all nozzles at such temperature, the air emerging from such nozzles will be stratified radially temperature wise, the inner stream emerging from passage 46 being at the highest temperature, and the intermediate stream emerging from the passage 44 being elevated to a temperature intermediate that emerging from passages 46 and 42. In practice the stream emerging from the passage 46 will have a temperature of 425° F. or more, and in emerging from the nozzle will impinge upon the spray pattern in the region 66, where the fog is most dense, and the moisture content the greatest. The highest temperature air will have a maximum effect upon the fog or mist, insofar as tending to produce enlarged droplet size in such region. The droplets being partially dried almost instantaneously by the high rate of heat exchange in the region 66 will proceed to the outer region 68 and thence the region 70 where successively lower temperatures of the air are encountered. Since partial drying has been effected in the region 66, the solids contained in the droplets would be liable to scorching or albumen coagulation in passing through the regions 68 and 70 where it not for the reduced temperature of the air blast of the streams from passages 44 and 42 impinging thereon, in addition to the usual evaporative cooling effect. It is desirable in milk drying that albumen remain unchanged during the process, and the lower temperature of the milk prior to spraying, and the rapidity of drying in the chamber, promotes this result.

The air blast will effectively carry the solids into the central region of the chamber, where the air blast velocity is substantially reduced, and completion of the drying thus takes place, while the dried particles are allowed to drop into the conveyor 72 at the base of the chamber 10, whence such particles are moved to the discharge duct 74. The lighter particles which do not drop to the base of the chamber due to entrainment in the air stream, will be carried to the chamber exhaust port 76, into a cyclone separator 78, the air outflow of which is controlled by an exhaust blower 80. The particles separated from the air stream in the separator 78 are discharged through the duct 82.

While the concentric passages of each nozzle have been illustrated as supplied from a single pressure source, it will be appreciated that the corresponding passages of the nozzles may be supplied with air at different pressures. For example, by suitable ducting and utilization of a separate blower, all of the passages 46 of the nozzles may be subjected to a higher pressure and thus the air stream emerging will have an increase in velocity. With such higher velocity, the cross section of the passages 46 may be reduced. Likewise, all of the passages 42 may be supplied with higher pressure than the others, and the cross section varied. Such variables may be useful in effecting a desirable change in the shape of the spray pattern, and in reducing turbulence, so that dried particles do not remain in the chamber unnecessarily beyond the time required for drying.

The size or diameter of the droplets is proportional to the surface tension and inversely proportional to the gas density and to the velocity of the drop relative to the velocity of the gas. Surface tension of milk increases with a lower temperature. Gas density decreases as temperature is increased. Taking the foregoing into consideration, it will be seen that the process renders it possible to take advantage of the factors conducive to producing droplets of maximum size, which result in a high proportion of the desirable relatively coarse powder referred to. The higher temperatures and lower density of the air directed into the heart of the spray permits application of a lower temperature to the milk supply with consequent increase in surface tension and viscosity, both of which temperature governed factors are of considerable importance in increasing drop size. By adjusting the jet velocity in relation to the air nozzle velocity so as to provide a minimum relative velocity compatible with adequate air current and spray contact for heat exchange within a chamber of reasonable dimension, an optimum commercially efficient process results, for producing predominately coarse powder. In the case of whole milk, such coarse powder aids in the reduction of oxygen content, thus leading to the more stable product referred to previously.

The relationship between droplet size $d_{max}$, which is the maximum diameter of droplet that can exist, surface tension $S_t$, air density $\rho$ and the relative velocity V between the drop and air can be expressed as follows:

$$d_{max} \approx k \frac{S_t}{\frac{1}{2}\rho V^2}$$

where $k$ is a constant.

Surface tension, which is a function of the critical temperature of the liquid at which surface tension is zero or $T_0$, and the absolute liquid temperature $T_1$ is expressed as follows:

$$S_t = S_{t0}\left(1 - \frac{T_0}{T_1}\right)$$

where $S_{t0}$ is a constant.

Air density $\rho$ is a function of the air temperature $Ta$ and air pressure P and the relationship is expressed as follows:

$$\rho = \frac{P}{RTa}$$

where R is a gas constant.

Substituting the relationship for air density in the relationship governing droplet size, results in the following relationship:

$$d_{max} \approx k \frac{S_t}{\frac{1}{2}\frac{P}{RTa}V^2}$$

or $$d_{max} \approx 2kR \frac{S_t Ta}{PV^2}$$

Thus it is seen that increase in surface tension, and air temperature effect an increased droplet size. A decrease in liquid temperature has the same effect, since such decrease increases the liquid viscosity. In the drying chamber the pressure is maintained nearly constant and close to atmospheric, by control over the volume of heated air introduced into the drying chamber, and the volume exhausted by the blower 80. The relative velocity between the air introduced, and the milk spray velocity is a matter of combined air and milk nozzle design.

It will thus be seen, that by graduating the temperature of the drying air so as to permit usage of the maximum temperature, at the same time permits the temperature of the milk sprayed to be reduced, so that the two temperature factors result in an increase in droplet size and the efficient production of a desirable coarse powder ranging as high as 600 microns in diameter.

Further, utilization of a higher air temperature promotes thermodynamic efficiency, requiring less overall heat. Localized temperatures, ranging as high as 700° F. may be utilized in this process of drying milk with the proper control.

Utilization of the process in the production of dried milk can result in a rate of production of as much as 1500 lbs. of dried milk per hour, in a reasonable size unit. The process permits the utilization of a relatively low temperature of the milk prior to spraying, highly desirable in the treatment of whole milk and the rapid conversion to a dry state, thereby subjecting the milk to high temperatures over a minimum period of time. At the same time a high proportion of coarse product of high solubility is obtained. As previously indicated, by high solubility is meant not only casein suspension solubility, but the speed of solubility, which might be termed wettability, or in general the ability of the powder to quickly reconstitute itself as milk when added to a proper amount of water.

While the invention has been described in connection with an illustration of apparatus for carrying out the process, it is to be understood that the invention is not to be limited thereby. As variations not departing from the spirit of the invention will be apparent to those skilled in the art, reference will be had to the appended claims for a definition of the limits of the invention.

What is claimed is:

1. The process of obtaining the solid constituent of liquid milk in the form of a dry powder, which process consists in concentrating the liquid milk by removing a large percentage of the water therefrom, converting within a drying chamber the concentrated milk into a fine divergent spray mist, generally having a pattern of revolution about an axis extending through the apex of the divergent spray mist, directing concentric annular streams of heated air into the drying chamber in a direction coaxial in respect to the axis of said spray pattern, and heating the air of the innermost annular stream of air to a higher temperature than the outermost streams of air, whereby to direct the higher temperature air on the portion of said spray mist where such mist is most dense and has the greatest moisture content, and collecting the dry powder deposited in the chamber.

2. The process of obtaining the solid constituent of liquid milk in the form of a dry powder, which process consists in concentrating the liquid milk by removing a large percentage of the water therefrom, controlling the temperature of said concentrated milk to obtain optimum surface tension and viscosity, converting within a drying chamber the concentrated milk into a fine divergent spray mist, generally having a pattern of revolution about an axis extending through the apex of the divergent spray mist, directing concentric annular streams of heated air into the drying chamber in a direction coaxial in respect to the axis of said spray pattern, and heating the air of the innermost annular stream of air to a higher temperature than the outermost streams of air, whereby to direct the higher temperature air on the portion of said spray mist where such mist is most dense and has the greatest moisture content, and collecting the dry powder deposited in the chamber.

3. The process of obtaining the solid constituent of liquid milk in the form of a dry powder, which process consists in concentrating the liquid milk by removing a large percentage of the water therefrom, converting within a drying chamber the concentrated milk into a fine divergent spray mist, having a pattern of revolution about an axis extending through the apex of the divergent spray mist, directing a concentric annular stream of heated air into the drying chamber in a direction coaxial in respect to the axis of said spray pattern, and applying heat to the air of said annular stream of air prior to contact with said mist, to provide a temperature gradient radially thereof, increasing in the direction toward the center of the stream, whereby to direct higher temperature air on the portion of said spray mist where such mist is most dense and has the greatest moisture content, and collecting the dry powder deposited in the chamber.

4. The process of obtaining the solid constituent of liquid whole milk in the form of a dry powder, which process consists in concentrating the liquid milk by removing a large percentage of the water therefrom, controlling the temperature of said concentrated milk to obtain optimum surface tension and viscosity, converting within a drying chamber the concentrated milk into a fine divergent spray mist having a pattern of revolution about an axis extending through the apex of the divergent spray mist, directing a concentric annular stream of heated air into the drying chamber in a direction coaxial in respect to the axis of said spray pattern, and applying heat to the air of said annular stream of air prior to contact with said mist to provide a temperature gradient radially thereof, increasing in the direction toward the center of the stream, whereby to direct higher temperature air on the portion of said spray mist where such mist is most dense and has the greatest moisture content, and collecting the dry powder deposited in the chamber.

5. The process of obtaining the solid constituent of liquid milk in the form of a dry powder, which process consists in concentrating the liquid milk by removing a large percentage of the water therefrom, converting within a drying chamber the concentrated milk into a fine divergent spray mist, having a pattern of revolution about an axis extending through the apex of the divergent spray mist, directing a concentric annular stream of heated air into the drying chamber in a direction coaxial in respect to the axis of said spray pattern, and applying heat to the air of said annular stream of air prior to contact with said mist, to provide a temperature gradient radially thereof, proportional to the density gradient of the spray mist.

6. The process of obtaining the solid constituent of liquid milk in the form of a dry powder, which process consists in converting within a drying chamber the milk into a fine divergent spray mist, having a pattern of revolution about an axis extending through the apex of the divergent spray mist, directing a concentric annular stream of drying air into the drying chamber in a direction coaxial in respect to the axis of said spray pattern, and applying heat to the air of said annular stream of air prior to contact with said mist, to provide a temperature gradient radially thereof, increasing in the direction toward the center of the stream, whereby to direct higher temperature air on the portion of said spray mist where such mist is most dense and has the greatest moisture content, and collecting the dry powder deposited in the chamber.

7. The process of obtaining the solid constituent of liquid milk in the form of a dry powder, which process consists in concentrating the liquid milk by removing a large percentage of the water therefrom, heating said concentrated milk, converting within a drying chamber the concentrated milk into a fine divergent spray mist, having a pattern of revolution about an axis extending through the apex of the divergent spray mist, directing concentric annular streams of heated air into the drying chamber in a direction coaxial in respect to the axis of said spray pattern, and applying heat to the air of the annular streams of air to provide a temperature gradient among the streams increasing in the direction toward the center thereof, said gradient varying between the temperatures of 250°–425° F., whereby to direct higher temperature air on the portion of said spray mist where such mist is most dense and has the greatest moisture content, and collecting the dry powder deposited in the chamber.

8. The process of obtaining the solid constituent of liquid milk in the form of a dry powder, which process consists in concentrating the liquid milk by removing a large percentage of the water therefrom, heating said concentrated milk to a temperature 130°–170° F., converting within a drying chamber the concentrated milk into a fine divergent spray mist, having a pattern of revolution about an axis extending through the apex of the divergent spray mist, directing concentric annular streams of heated air into the drying chamber in a direction coaxial in respect to the axis of said spray pattern, and heating the air of the innermost annular stream of air to a higher temperature than the outermost streams of air and to a temperature in the order of 425° F., whereby to direct the higher temperature air on the portion of said spray mist where such mist is most dense and has the greatest moisture content, and collecting the dry powder deposited in the chamber.

9. The process of producing a dry powder from liquid milk, which comprises spraying said milk in a divergent pattern under pressure in a dehydrating chamber from a small orifice to provide substantially a cone of mist, delivering an annular blast of heated air in a direction parallel to the axis of the cone of mist and concentric with the axis of the cone against the apex end of the cone of mist, and heating the air of said blast closest to the axis to a temperature above that of the remainder of the blast, before said air reaches the cone of mist.

10. The process of producing a dry powder of large diameter particles from a liquid containing solids, which comprises atomizing said liquid under pressure from a central source in a drying chamber into a divergent spray having a pattern of revolution about an axis extending through said central source, directing an annular current of heated air into said spray pattern in a direction coaxial with the axis of revolution, and heating the air of said current closest to the axis thereof to a temperature substantially above that of the remaining current prior to impinging upon said spray.

11. The process of producing a dry powder of maximum coarseness from liquid whole milk which comprises concentrating the liquid milk by removing a large percentage of water therefrom, raising the temperature of said concentrated milk to a temperature of 130° F. and subjecting the concentrated milk to a pressure in the order of 4,000 lbs. per square inch, providing a blast of heated air having a temperature gradient crosswise thereof, and spraying said milk across said blast in the direction of temperature decrease of the blast whereby to subject said spray to contact with air, the temperature of which decreases with the density of the spray.

12. The process of obtaining the solid constituent of liquid milk in the form of a dry powder, which process consists in concentrating the liquid milk by removing a large percentage of the water therefrom, heating said concentrated milk to a temperature of 130°–170° F., converting within a drying chamber the concentrated milk into a fine divergent spray mist, having a pattern of revolution about an axis extending through the apex of the divergent spray mist, directing concentric annular streams of heated air into the drying chamber in a direction coaxial in respect to the axis of said spray pattern, and heating the air of the innermost annular stream of air to a higher temperature than the outermost streams of air and to a temperature in the order of 700° F., whereby to localize the higher temperature air on the portion of said spray mist where such mist is most dense and has the greatest moisture content, and collecting the dry powder deposited in the chamber.

13. The process of obtaining the solid constituent of liquid milk in the form of a dry powder, which process consists in concentrating the liquid milk by removing a large percentage of the water therefrom, heating said concentrated milk, converting within a drying chamber the concentrated milk into a fine divergent spray mist, having a pattern of revolution about an axis extending through the apex of the divergent spray mist, directing concentric annular streams of heated air into the drying chamber in a direction coaxial in respect to the axis of said spray pattern, and applying heat to the air of the annular streams of air to provide a temperature gradient among the streams increasing in the direction toward the center thereof, said gradient varying between the temperatures of 250°–425° F., whereby to direct higher temperature air on the portion of said spray mist where such mist is most dense and has the greatest moisture content, collecting the dry powder deposited in the chamber, and collecting air stream entrained powder on exhausting from the chamber.

14. The process of producing a dry powder consisting of large diameter particles from a liquid containing solids in solution or suspension which comprises atomizing said liquid under pressure from a central source in a drying chamber into a divergent spray having a pattern of revolution about an axis extending through said central source, directing an annular current of heated air into said spray pattern in a direction coaxial with the axis of revolution, and heating the air of said current closest to the axis thereof to a temperature substantially above that of the remaining current prior to impinging upon said spray.

References Cited in the file of this patent

UNITED STATES PATENTS

| | | |
|---|---|---|
| 2,188,506 | Hall | Jan. 30, 1940 |
| 2,383,070 | Mook | Aug. 21, 1945 |